United States Patent [19]

Monroe

[11] 4,296,674
[45] Oct. 27, 1981

[54] QUICK TAKE-UP BRAKE BOOSTER
[75] Inventor: William E. Monroe, Syracuse, Ind.
[73] Assignee: The Bendix Corporation, Southfield, Mich.
[21] Appl. No.: 50,912
[22] Filed: Jun. 21, 1979
[51] Int. Cl.³ ............................................. F15B 13/10
[52] U.S. Cl. .................................... 91/391 R; 91/384; 60/547 B
[58] Field of Search .................. 91/391 R, 391 A, 384; 60/547 B

[56] References Cited

U.S. PATENT DOCUMENTS

| 2,976,849 | 3/1961 | Stelzer | 91/391 R |
| 3,063,427 | 1/1962 | Hill | 91/391 A |
| 3,724,332 | 4/1973 | Bach | 91/391 R |

FOREIGN PATENT DOCUMENTS

| 361894 | 6/1931 | United Kingdom | 91/384 |
| 1105351 | 3/1968 | United Kingdom | 91/391 R |

Primary Examiner—Paul E. Maslousky
Attorney, Agent, or Firm—Paul David Schoenle; Ken C. Decker

[57] ABSTRACT

A hydraulic brake booster includes a housing substantially defining a pressure chamber and movably supporting a control valve and a piston. An input assembly extends into the pressure chamber and cooperates with the control valve to communicate fluid pressure to the pressure chamber. The input assembly is pivotal relative to the piston to a first position wherein fluid pressure communicated to the pressure chamber acts against the piston to move the same while the input assembly remains substantially stationary in the first position. In particular, the input assembly includes a lever with a slot for receiving a portion of the piston. When the lever is pivoted to the first position, the piston portion moves within the slot from one end of the slot to the other end. A pair of springs extend between the housing and the piston and lever, respectively, to bias the piston and lever to a rest position abutting the housing.

6 Claims, 2 Drawing Figures

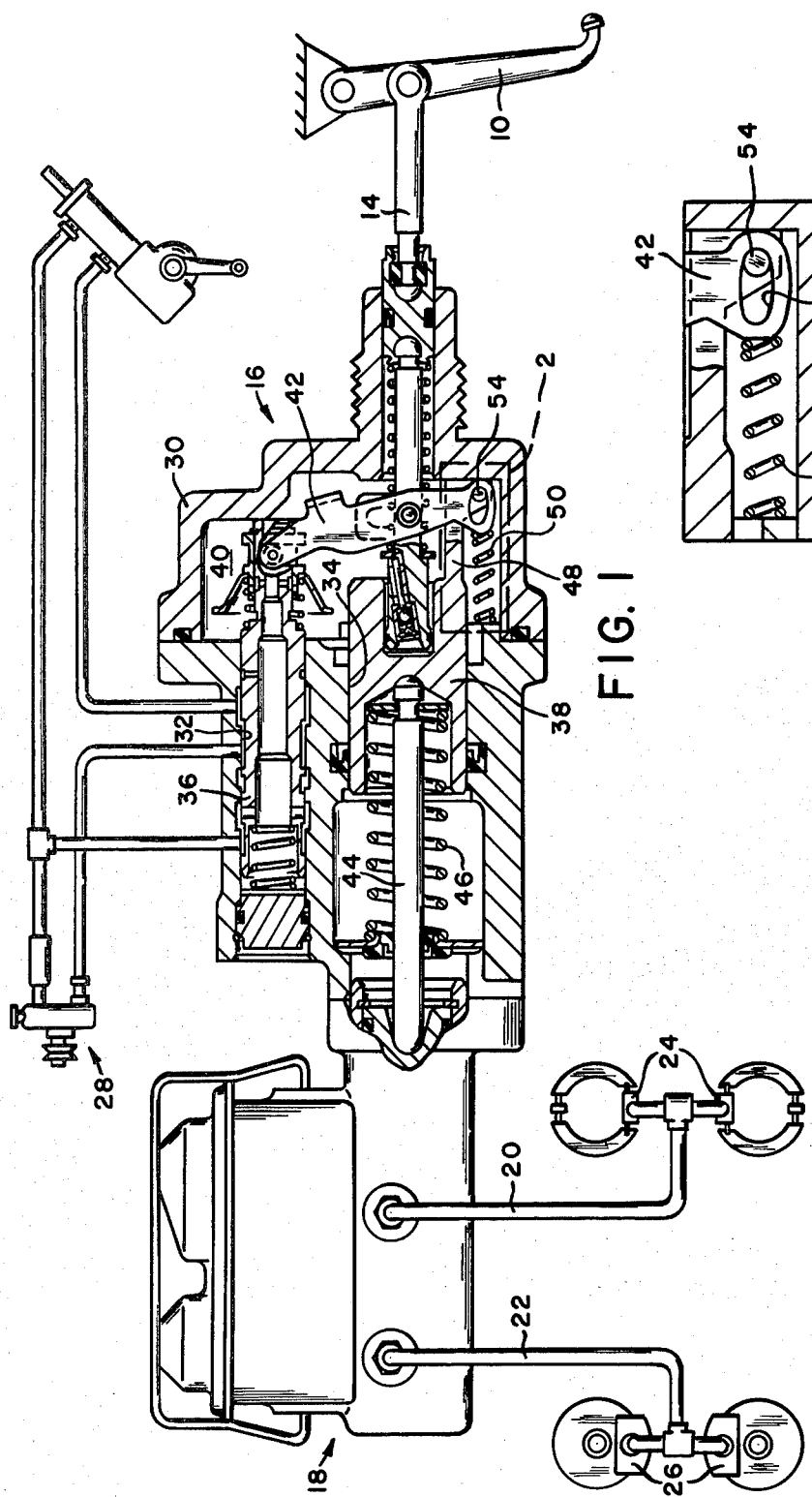

QUICK TAKE-UP BRAKE BOOSTER

BACKGROUND OF THE INVENTION

A hydraulic brake booster, such as shown in U.S. Pat. application Ser. No. 885,825, includes a housing which supports a control valve and a piston and substantially defines a pressure chamber. An input assembly extends into the housing and cooperates with the control valve to communicate fluid pressure to the pressure chamber. The piston is movable relative to the housing in response to fluid pressure in the pressure chamber to effectuate a brake application.

The input assembly includes a rod extending into the housing and a lever engageable with the control valve and the piston. The rod is movable to pivot the lever about the piston in order to move the control valve to a position communicating fluid pressure to the pressure chamber. If the fluid pressure communicated to the pressure chamber is insufficient to move the piston, the rod or lever is movable relative to the piston to open communication between a storage chamber and the pressure chamber, thereby providing a safety brake application.

During a brake application, the input assembly is movable with the piston so that the ratio of the input movement to the output movement is substantially constant. As a result, the input assembly must travel substantially the same distance as the piston before hydraulic "slack" and brake shoe clearances are taken up.

SUMMARY OF THE INVENTION

The present invention covers an improvement in the above hydraulic brake booster to enable an output piston to move a greater distance than an input rod when a brake application is initially effected. In particular, the hydraulic brake booster is coupled to a master cylinder such that movement of the output piston causes the master cylinder to communicate pressurized fluid to a pair of front and rear brake assemblies. Because the movement of the output piston is initially greater than the movement of the input rod, the brake assemblies can maintain a greater running clearance with associated rotatable members, thereby substantially eliminating drag therebetween.

The hydraulic brake booster includes a housing defining a pressure chamber and supporting a control valve and an output piston. An input rod extending into the pressure chamber opposes the output piston and is engageable with a lever extending between the control valve and the output piston. The lever forms a slot for receiving a portion of the output piston. The output piston is biased by a spring to a rest position abutting the housing and the lever is biased by a resilient member to a rest position also abutting the housing. When the output piston and lever are abutting the housing the piston portion extending into the slot is disposed at one end of the slot. Movement of the input rod into the housing causes the lever to pivot about the piston to a first position thereby moving the control valve to communicate pressurized fluid to the pressure chamber. With the lever remaining in the first position, the fluid pressure within the pressure chamber acts against the output piston to move the latter relative to the lever. The output piston portion moves within the slot from the one end to the other end whereupon the piston and lever move together. Further movement of the input rod pivots the lever about the piston while at the same time moving the lever with the piston, as the latter moves in response to the fluid pressure within the pressure chamber. Upon termination of braking, the spring and resilient member force the piston and lever respectively, to return to their rest position in abutment with the housing.

It is a primary object of the present invention to provide a hydraulic brake booster which includes a quick take-up feature so that an output piston moves a greater distance than an input rod when a brake application is initially effected.

BRIEF DESCRIPTION OF THE DRAWINGS

FIG. 1 is a schematic view of a brake system having a hydraulic brake booster illustrated in cross section; and FIG. 2 is an enlarged cross-sectional view of the encircled portion of FIG. 1.

DETAILED DESCRIPTION

In the brake system of FIG. 1, a brake pedal 10 is coupled to a portion of a vehicle frame 12 to pivot during a brake application. The pedal couples to an input rod 14 of a hydraulic brake booster 16 and the booster carries a master cylinder 18. Brake lines 20 and 22 connect the master cylinder with respective brake assemblies 24 and 26. As is well known in the art, the pedal 10 is pivoted by a vehicle operator to move the input rod 14 within the hydraulic brake booster 16. The booster utilizes fluid pressure generated by a pump 28 to transmit a force to the master cylinder, which, in turn, communicates fluid pressure to the brake assemblies to effectuate a brake application.

The hydraulic brake booster 16 includes a housing 30 with a pair of bores 32 and 34 for movably supporting a control valve 36 and output piston or pressure responsive member 38, respectively. The housing substantially defines a pressure chamber 40 and the input rod, or an extension thereof, extends into the pressure chamber to support a lever 42. The lever 42 is engageable with the control valve and pivotal relative to the piston to move the control valve relative to the housing. Movement of the control valve opens communication between the pump 28 and the pressure chamber 40 to communicate fluid pressure to the pressure chamber 40. The piston 38 is movable within the bore 34 in response to the fluid pressure within the pressure chamber 40. An output member 44 extends from the piston 38 to the master cylinder 18 and is movable with the piston.

In the rest position illustrated, a spring 46 biases the piston 38 to the right to engage an arm 48 of the piston with the housing 30. The lever 42 also includes a rest position wherein a spring 50 extending from the housing 30 to the lever 42, biases the lever 42 to engage the housing 30 at substantially the same location as the arm 48.

Turning to FIG. 2, the lever 42 includes a slot 52 at the end which is biased into engagement with the housing 30 by spring 50. The piston arm 48 is provided with a portion or pin 54 extending into the slot 52. When the piston and lever are in their rest positions, the pin 54 is disposed to the side of slot 54 adjacent housing 30.

MODE OF OPERATION

When a vehicle operator steps on pedal 10 to initiate a brake application, the input rod 14 is engageable with the lever 42 to pivot the same about piston arm 48. The pivoting lever moves the control valve 36 to a position communicating fluid pressure to the pressure chamber 40. The fluid pressure within the pressure chamber 40 acts against the piston 38 to move the latter within bore 34 and to move the output member 44 within master cylinder 18.

When the pivoting lever reaches a first position to communicate fluid pressure to the pressure chamber 40, the piston 38 is movable in response to the fluid pressure. The piston pin 54 moves with the piston and the spring maintains the lever substantially in the rest position so that the piston and pin move within the slot 52 from the one end to the other end. Consequently, the input rod 14 and lever 42 remain substantially stationary in the first position while the piston and output member are movable by fluid pressure within the pressure chamber. The movement of the piston relative to the substantially stationary lever causes the master cylinder to communicate fluid pressure to the brake assemblies in response to slight movement of the input rod 14. In the first position of the lever, the input rod is substantially fixed relative to the housing while the output piston is movable through a distance measured by the length of the slot 52.

Further movement of the input rod causes the lever to pivot past the first position to move the control valve to a position increasing the communication of fluid pressure to the pressure chamber. The piston is movable in response to the increase in fluid pressure toward the master cylinder 18. The lever is now movable with the piston as the pin 54 is abutting the other end of slot 52. Movement of the lever with the piston compresses spring 50 when the lever is displaced from the first position. Upon termination of the brake application, the spring 46 and 50 bias the piston and lever, respectively, to return to their rest positions abutting the housing 30.

I claim:

1. In a hydraulic brake booster, a housing substantially defining a pressure chamber, a control valve cooperating with the housing to communicate fluid pressure to the pressure chamber, a pressure responsive member carried by the housing and movable in response to fluid pressure within the pressure chamber from a rest position to effectuate a brake application, an input member extending into the housing and being movable by an operator during a brake application, a lever engageable with the input member, the pressure responsive member and the control valve, the lever forming a connection with the pressure responsive member which permits the pressure responsive member to move relative to the lever in response to fluid pressure within the pressure chamber, and a resilient member engages the housing and the lever to bias the latter to a rest position engaging the housing.

2. The hydraulic brake booster of claim 1 in which the connection between the pressure responsive member and the lever provides for the pressure responsive member to move relative to the lever during a first part of the brake application and provides for the pressure responsive member to move with the lever thereafter.

3. In a hydraulic brake booster, a housing substantially defining a pressure chamber, a control valve cooperating with the housing to communicate fluid pressure to the pressure chamber, a pressure responsive member carried by the housing and movable in response to fluid pressure within the pressure chamber from a rest position to effectuate a brake application, an input member extending into the housing and being movable by an operator during a brake application, a lever engageable with the input member, the pressure responsive member and the control valve, the lever forming a connection with the pressure responsive member which permits the pressure responsive member to move relative to the lever in response to fluid pressure within the pressure chamber, and a resilient member extending between the housing and the lever to bias the latter to a rest position engaging the housing, the resilient member being engageable with the lever at an end remote from the control valve.

4. In a hydraulic brake booster, a housing substantially defining a pressure chamber, a control valve cooperating with the housing to communicate fluid pressure to the pressure chamber, a pressure responsive member carried by the housing and movable in response to fluid pressure within the pressure chamber from a rest position to effectuate a brake application, an input member extending into the housing and being movable by an operator during a brake application, and a lever engageable with the input member, the pressure responsive member and the control valve, the lever forming a connection with the pressure responsive member which permits the pressure responsive member to move relative to the lever in response to fluid pressure within the pressure chamber, the lever defining a slot and a pin connected to the pressure responsive member extends into the slot, the pin being movable within the slot during a brake application.

5. In a hydraulic brake booster having a housing movably supporting a control valve and a piston, the housing defining a pressure chamber which receives fluid pressure via the control valve to bias the piston to move in response to the fluid pressure, and an input assembly cooperating with the control valve to control communication of fluid pressure to the pressure chamber, characterized by the input assembly being movable to a first position to communicate fluid pressure to the pressure chamber, the piston moving in response to fluid pressure within the pressure chamber while the input assembly remains substantially stationary in the first position, the input assembly including a rod extending into the housing and a lever engageable with the control valve and the piston, the lever defining a slot for movably receiving a portion of the piston, and a resilient member extends from the housing to the lever to bias the latter to a rest position and the piston portion is movable within the lever slot independently of the resilient member.

6. In a hydraulic brake booster having a housing movably supporting a control valve and a piston, the housing defining a pressure chamber which receives fluid pressure via the control valve to bias the piston to move in response to the fluid pressure, and an input assembly cooperating with the control valve to control communication of fluid pressure to the pressure chamber, characterized by the input assembly being movable to a first position to communicate fluid pressure to the pressure chamber, the piston moving in response to fluid pressure within the pressure chamber while the input assembly remains substantially stationary in the first position, the input assembly including a rod extending into the housing and a lever engageable with the control valve and the piston, the lever defining a slot for movably receiving a portion of the piston, the piston being biased by a spring to a non-braking position abutting the housing, the lever being biased to a rest position abutting the housing and the portion of the piston extending into the slot being disposed at one end of the slot when the lever and piston are abutting the housing.

* * * * *